United States Patent [19]

Polak et al.

[11] Patent Number: 4,606,717
[45] Date of Patent: Aug. 19, 1986

[54] APPARATUS FOR THE PREPARATION OF HOLLOW BODIES FROM A THERMOPLASTIC MATERIAL BY THE BLOW MOLDING PROCESS

[75] Inventors: Gerhard Polak, Rührmoos, Austria; Norbert Dini, Deisenhofen, Fed. Rep. of Germany

[73] Assignee: Krauss-Maffei AG, Fed. Rep. of Germany

[21] Appl. No.: 760,534

[22] Filed: Jul. 30, 1985

[30] Foreign Application Priority Data

Aug. 4, 1984 [DE] Fed. Rep. of Germany ....... 3428823

[51] Int. Cl.[4] .......................................... B29C 49/30
[52] U.S. Cl. .................................. 425/541; 425/589; 425/408
[58] Field of Search ............... 425/541, 589, 522, 538, 425/594, 542, 408

[56] References Cited

U.S. PATENT DOCUMENTS

| | | | |
|---|---|---|---|
| 3,964,852 | 6/1976 | Marfiewiez | 425/326 B |
| 4,304,543 | 12/1981 | Rolniezak et al. | 425/532 |
| 4,432,720 | 2/1984 | Watt et al. | 425/541 |
| 4,560,341 | 12/1985 | Hafele | 425/541 |

FOREIGN PATENT DOCUMENTS

| | | |
|---|---|---|
| 7331513 | 8/1973 | Fed. Rep. of Germany . |
| 2413880 | 9/1975 | Fed. Rep. of Germany . |
| 2218852 | 10/1978 | Fed. Rep. of Germany . |

OTHER PUBLICATIONS

Kunststoff-Verarbeitung im Gespraech 3 Blasformen, 1973, BASF.
Verarbeitungsmaschinen und-geraete, Kunststoffe 70 (1980) II, p. 772.
"Gleitlager", Schmid et al, Springer-Verlag, 1953.

Primary Examiner—W. E. Hoag
Attorney, Agent, or Firm—Robert J. Koch

[57] ABSTRACT

An apparatus for the production of hollow bodies by blow molding is made up of a locking unit mounted on a bottom stand including a first and second mold support element, each carrying one half of a mold. The two mold support elements are kinematically coupled together by a synchronizing mechanism and fastened to guide spars, with the second mold support elements being displaceable parallel to the first mold support element.

In order to prevent the deflection of the guide spars under the effect of the locking pressure leading to the gaping apart of the mold support elements, the locking unit includes a rigid support frame which relieves the bending stress on the guide spars. The guide spars carrying the locking unit are supported on the bottom stand in an axially displaceable manner.

5 Claims, 3 Drawing Figures

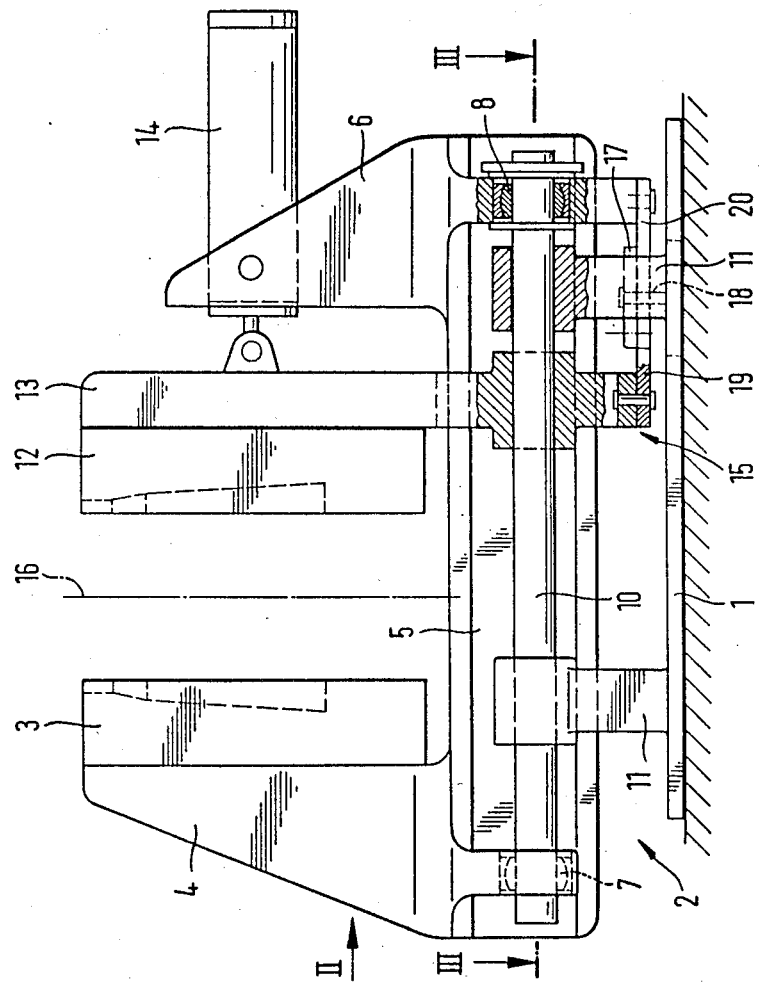

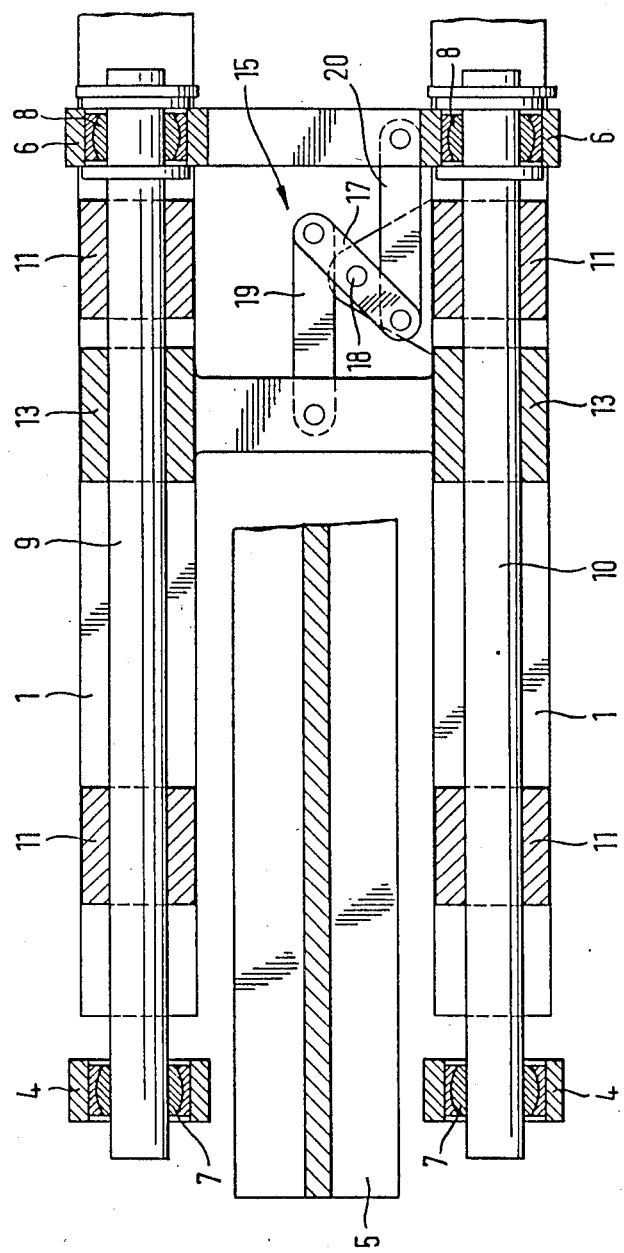

4,606,717

APPARATUS FOR THE PREPARATION OF HOLLOW BODIES FROM A THERMOPLASTIC MATERIAL BY THE BLOW MOLDING PROCESS

BACKGROUND OF THE INVENTION

1. Field of the Invention

The invention relates to an apparatus for the preparation of hollow bodies from a thermoplastic material by a blow molding process.

2. Description of the Prior Art

In installations such as shown in BASF AG, Ludwigshafen "Symposium on the Processing of Synthetic Plastics", 3 Blow Molding, 1973, pages 116 to 122, the mold support element became inclined under the effect of the mold locking pressure, leading to a nonuniform distribution of the locking pressure in the mold parting plane between the two halves of the mold. Furthermore, the guide spars are bent by the bending moment introduced, causing severe wear of the spars.

SUMMARY OF THE INVENTION

It is the object of the invention to design an apparatus of the abovementioned type with simple means, so that the disadvantages resulting from the effect of the locking pressure with regard to the locking function and exposure to wear are to a great extent eliminated.

This object is attained according to the invention essentially by the division of the frame function and the guide function.

The frame function is taken over by the supporting frame, through the high bending rigidity of which the locking unit suffers only a slight deflection, so that the function of the guide spars, i.e., the assurance of a highly accurate locking motion of the mold support elements, is not affected by an excessive deflection. The layout of the support frame according to the invention permits the application of higher locking forces, whereby the locking conditions at the mold parting plane between the two mold support elements may be further improved.

The elastic decoupling of the frame and guide function may be further improved by providing spherical bearings to mount the functional parts of the locking unit in a manner secured against displacement on the guide spars. By virtue of this type of fastening the guide spars do not participate in the elastic bending deformation of the support frame. The spar parts remain straight, i.e., in a secant position with respect to the bending line described by the support frame, even in case of a strong deflection of said support frame. As thereby under a bending stress only the mold support element fixedly joined to the support frame becomes inclined and the second mold support element located displaceably on the guide spars is not affected by the elastic deformation of the support frame, the arrangement of the spherical bearings leads to a halving of the deformation path otherwise resulting between the mold support elements.

By the elastic deformation and inclination, respectively, of the first mold support element, a nonuniformly acting force is introduced into the second, upright mold support element, which could result in a tilting of the guide of the second mold support element on the guide spars. To eliminate this problem, it is advantageous to couple the two mold support elements to a synchronizing device with an additional lever system coupled to it for the synchronous actuation of gripping levers in opposing positions in relation to the guide spars and a mold parting plane.

An example of embodiment of the invention is described below with reference to the drawing.

BRIEF DESCRIPTION OF THE DRAWINGS

In the drawings:

FIG. 1 shows a lateral view of the locking unit resting on a bottom stand of an installation for the production of hollow bodies of a thermoplastic material by the blow molding process;

FIG. 2 shows the front elevation of the installation according to FIG. 1; and

FIG. 3 shows a sectional view on the line III—III in FIG. 1.

DETAILED DESCRIPTION OF THE PREFERRED EMBODIMENT

The installation shown in FIGS. 1 to 3 illustrates the locking unit 2 resting on a bottom stand 1 of a machine for the production of hollow bodies from a thermoplastic material by the blow molding process.

The locking unit 2 comprises a first mold support element 4 carrying a mold half 3, said mold support element 4 being joined in a single piece with the support frame 5 and a support 6. This single piece structural unit is connected fixedly by means of spherical bearings 7 and 8 with two parallel guide spars 9 and 10 mounted displaceably on bearing supports 11 of the bottom stand 1. The spherical bearing 8 is stationary and the bearing 7 is a movable bearing.

A second mold support element 13 carrying the half mold 12, is resting on the guide spars 9 and 10 and may be displaced by means of a hydraulic cylinder 14, articulated with one end to the second mold support element 13 and with the other to the support 6.

The two mold support elements 4 and 13 are coupled to each other under the guide spars 9 and 10 by means of a synchronizing device 15 (FIG. 3) effecting upon the actuation of the hydraulic cylinder 14 a synchronous closing movement of the two mold support elements 4 and 13, so that the two mold halves 3 and 12 are closing in the spatially fixed mold parting plane 16.

The synchronizing device 15 consists of an articulated lever system wherein an articulated lever 17 is centeringly mounted on a rotating axle 18 fastened to the bottom stand 1 and both ends of the articulated lever 17 are connected hingedly by means of a pull and push rod 19 and 20 with a first and a second mold support element 4 and 13.

In principle, synchronization may also be effected by means of a rack and pinion synchronizing mechanism.

The support frame 5 has the cross-sectional shape of a double T beam (FIG. 2), which provides it with a high bending strength. In this manner elastic deformations of the locking system potentially leading to the inclination of the mold halfs 3 and 12 with respect to the spatially fixed mold parting frame 16 and to wear phenomena on the sliding surfaces of the guide spars 9 and 10, due to the application of the locking forces (locking force direction II, FIG. 1) is extensively reduced. The effects of bending deformations of the support frame 5 that may still take place are further reduced by the arrangement of the spherical bearings 7 and 8, as the latter prevent the introduction of bending moments into the guide spars 9 and 10. Consequently the guide spars 9 and 10 remain straight, thereby assuring optimum bearing properties during the displacement of the second mold support element 13 and the displacement of the guide spars 9 and 10 on the supports 11 of the bottom stand 1. Any tilting that potentially may lead to wear is thereby excluded.

Finally, the inclination of the form halves 3 and 12 with respect to the mold parting plane 16 is halved, as only the first mold support element 4 fixedly joined to the elastically deforming support frame 5 is becoming inclined.

The division according to the invention of the frame function and the guide function creates substantially more favorable locking conditions between the halves of the mold, which subsequently may be further improved by the application of higher locking forces permitted by the locking system in view of its greater rigidity.

In the case of the use of a rack and pinion synchronizing mechanism the two racks engaging a pinion mounted on the bottom stand are corresponding to the push and pull rods 19 and 20 of the articulated lever system. The two racks moving synchronously in opposite directions are connected with the first and second mold support element.

What is claimed is:

1. An apparatus for production of hollow bodies from a thermoplastic material by a blow molding process with a locking unit comprising:
    first and second means for supporting mold halves, each bearing one half of a mold;
    synchronizing means, kinematically joining said first and second means for supporting, for affecting a synchronous closing motion of said first and second means for supporting with respect to each other;
    spar means for guiding said means for supporting wherein said first means for supporting is fixedly attached to said spar means;
    cylinder means for displacing said second means for supporting parallel to the first means for supporting on the spar means articulated on one end to said second means for supporting and on the other end to a cylinder support fixedly joined to said first means for supporting, wherein said cylinder means and said second means for supporting are located between said cylinder support and said first means for supporting;
    rigid support frame means for fixedly connecting said cylinder support to said first means for supporting wherein said support frame is a single piece with a high bending rigidity;
    said spar means being supported in an axially displaceable manner on a bottom stand.

2. An apparatus as in claim 1 wherein said synchronizing means comprised an articulated lever system, wherein an articulated lever is centeringly mounted on a rotating axle fastened to the bottom stand, with the two ends of the articulated lever hingedly connected by means of push and pull rods with the first and second means for supporting.

3. An apparatus as in claim 1 further comprising a plurality of spherical bearings for mounting functional elements of the locking unit on the spar means.

4. Apparatus as in claim 3, wherein the first and second means for supporting and the synchronizing means together with further means for the synchronous actuation of gripping levers are located opposite to each other in relation to the spar means.

5. Apparatus according to claim 1 wherein the first and second means for supporting and the synchronizing means together with further means for the synchronous actuation of gripping levers are located opposite to each other in relation to the spar means.

* * * * *